No. 710,148. Patented Sept. 30, 1902.
F. HODGKINSON.
BALANCING MACHINE.
(Application filed Mar. 1, 1900.)
(No Model.) 2 Sheets—Sheet 1.
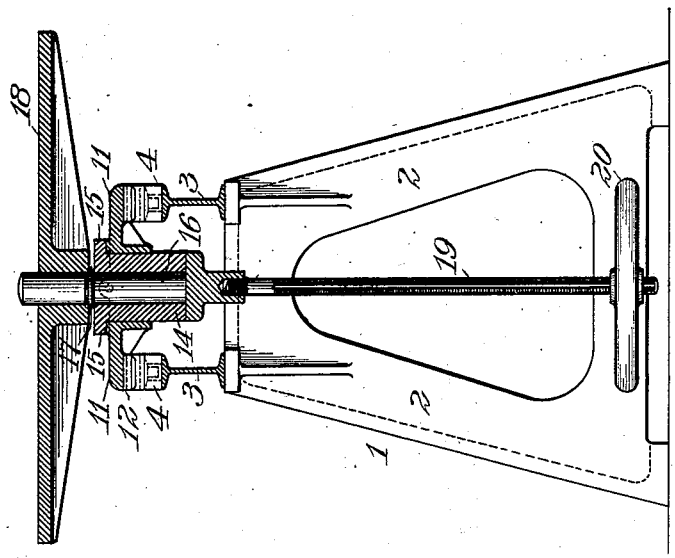
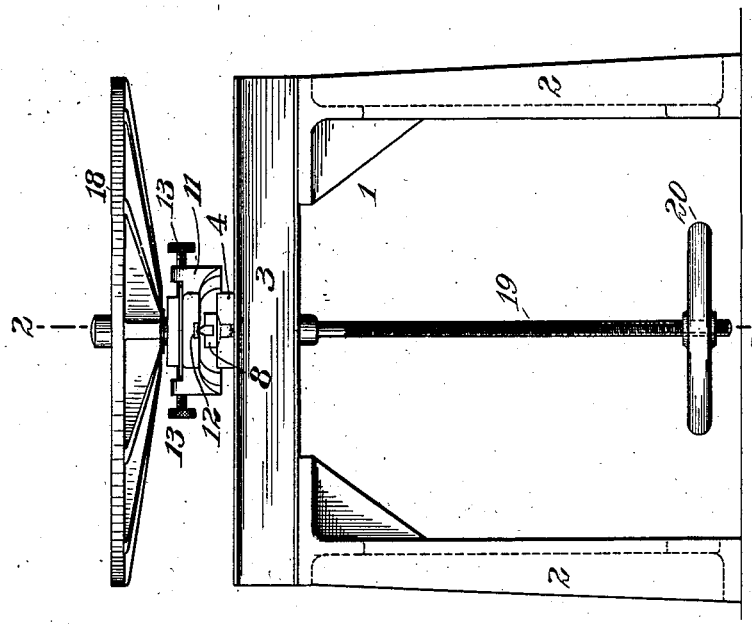
Witnesses:
Inventor
Francis Hodgkinson
By
Attorney No. 710,148. Patented Sept. 30, 1902.
F. HODGKINSON.
BALANCING MACHINE.
(Application filed Mar. 1, 1900.)
(No Model.) 2 Sheets—Sheet 2.
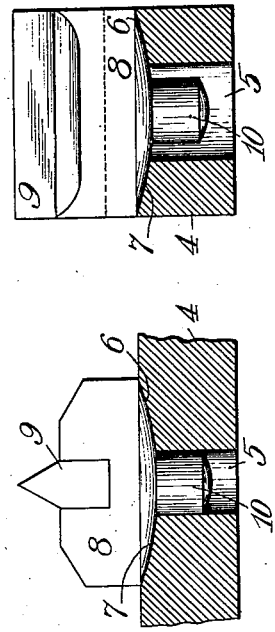
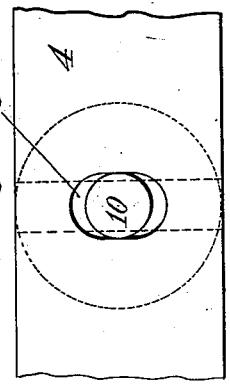
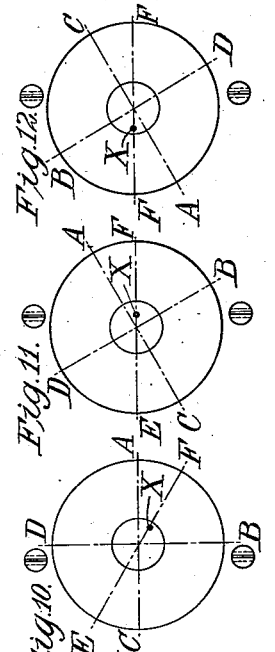
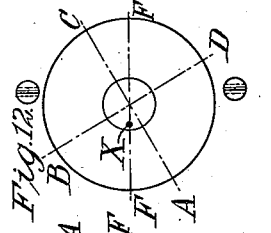
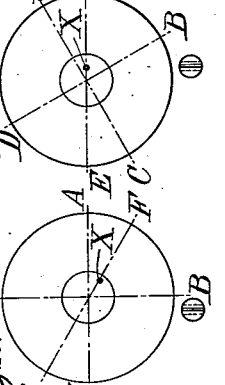
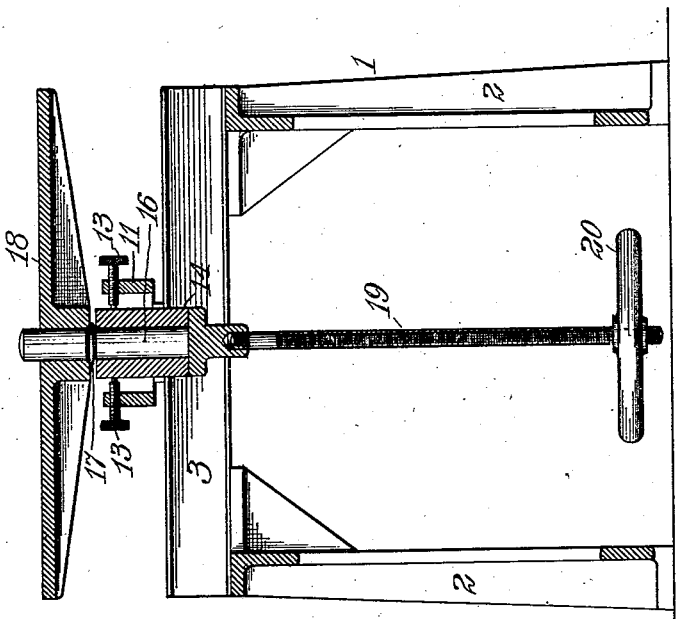
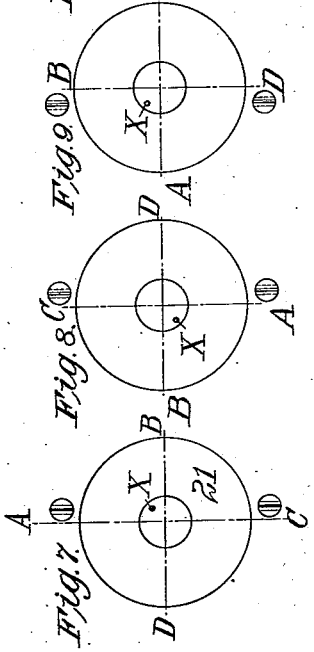
Witnesses:
C. L. Belcher
Bumner Deikert
Inventor
Francis Hodgkinson
By Wesley G. Carr
Attorney

UNITED STATES PATENT OFFICE.

FRANCIS HODGKINSON, OF WILKINSBURG, PENNSYLVANIA, ASSIGNOR TO THE WESTINGHOUSE MACHINE COMPANY, A CORPORATION OF PENNSYLVANIA.

BALANCING-MACHINE.

SPECIFICATION forming part of Letters Patent No. 710,148, dated September 30, 1902.

Application filed March 1, 1900. Serial No. 6,987. (No model.)

*To all whom it may concern:*

Be it known that I, FRANCIS HODGKINSON, a subject of the Queen of Great Britain and Ireland, residing at Wilkinsburg, in the county of Allegheny and State of Pennsylvania, have invented a new and useful Improvement in Balancing-Machines, of which the following is a specification.

My invention relates to the balancing of fly-wheels and similar devices intended for rotation; and it has for its object to provide a machine of simple and inexpensive construction which may be conveniently and advantageously utilized to determine in what manner and to what degree a body, such as a fly-wheel, intended for rotation deviates from the desired condition in which the material of which it is composed is uniformly disposed at all points that are equidistant from the center—in other words, so that the metal or other material of which the device is made may be so disposed that the device would remain in a horizontal position if supported at its middle point and were free to tilt in any direction.

It is of material importance that fly-wheels and similar circular or cylindrical parts carried by rapidly-rotating shafts should be perfectly balanced in order that there may be no irregularity in the rotation due to unequal distribution of material and also in order that no transverse strains may be exerted upon such shafts by reason of inequality in the distribution of the material revolving about the shaft.

With these ends in view I have devised the mechanism shown in the accompanying drawings, in which—

Figure 1 is a side elevation of a machine embodying my invention. Fig. 2 is a vertical section taken on line II II of Fig. 1. Fig. 3 is a central vertical section through the machine, taken at right angles to the section of Fig. 2. Figs. 4 and 5 are detail views taken at right angles to each other, partially in section and partially in elevation, of a knife-edged block and its support, such as I prefer to employ, portions of the support being broken away in Fig. 4. Fig. 6 is a plan view looking upward of the parts shown in Figs. 4 and 5, portions of the support being broken away. Figs. 7 to 12, inclusive, are diagrams illustrating the use of my invention in balancing a wheel or ring.

Referring now particularly to Figs. 1 to 6, inclusive, the frame 1 for supporting the operating parts of the machine may be of any desired or suitable construction, here shown as comprising two end standards 2, joined at their tops by two I-bars 3. Mounted upon each of the I-bars 3, substantially midway of its ends, is a supporting-block 4, having a vertical opening 5 extending therethrough, said opening being oblong in shape, the maximum horizontal dimension being in a direction at right angles to the lengths of the I-bars 3. Each of the supporting-blocks 4 has a spherically-curved seat 6 in its upper face, on which is located the spherically-curved face 7 of a block 8. Each block 8 has a knife-edged plate 9 seated in a suitable recess formed in the block, the wedge-shaped portion of the plate 9 projecting above the upper face of the block 8. The lower face of each of the blocks 8 is provided with a pin 10, which projects into the recess 5 and is of approximately the same thickness as the lesser width of the recess 5. The pins 10 are shown as cylindrical in form; but they might obviously have a different form in cross-section provided their thicknesses were substantially equal to the lesser width of the recess 5 in the corresponding direction and the thicknesses at right angles thereto were less than the other dimension of the said recess, so as to permit the block 8 to move on its spherical bearing in the plane of the knife-edge in order to render the knife-edge bearings self-alining. Mounted upon the knife-edge bearings 9 is a beam 11, provided with knife-edge bearing-blocks 12 in position to rest upon the knife-edges 9. The beam 11 is an open beam, and its sides parallel to the knife-edges are provided with adjusting-screws 13, the purpose of which will hereinafter more fully appear.

Located upon the beam 11 is a block 14, having flanges 15 at its top that project over and rest upon the corresponding sides of the beam 11. The width of the block 14 between the sides of the beam occupied by the adjusting-screws 13 is considerably less than the space between the said sides, as is clearly indicated in Figs. 1 and 3. The block 14 is provided with a cylindrical seat or socket, in which is located a spindle 16. This spindle projects above the top of the block 14 and is preferably provided with an annular flange 17 adjacent to the said block. Mounted upon the spindle above the flange is a turn-table 18. So far as the operation of the turn-table is concerned the spindle may be stationary and the turn-table be rotatable thereon, or the turn-table may be fastened to the spindle and the latter be rotated in its socket in the block 14, or the spindle may have a loose fit in both the turn-table and the block. Depending from the block 14 or from an extension thereof is a screw-threaded rod 19, on which is mounted a weight 20, here shown as having the form of a hand-wheel. By reason of the screw-threaded connection between the rod 19 and the weight 20 the latter may be moved up and down on the rod to adjust the center of gravity of the connected parts which are supported on the knife-edge bearings. I prefer to employ as long a rod as possible in order that unnecessary weight upon the knife-edges may be avoided by making the adjusting-weight 20 comparatively small.

The operation and use of the apparatus will now be described in connection with Figs. 7 to 12 of the drawings.

Assuming that the turn-table and its connected parts are first properly balanced, so that the upper surface of the turn-table will not deviate from a horizontal plane during a complete movement of rotation, the ring or wheel 21 to be balanced is placed upon the turn-table and concentrically located with reference to the spindle and properly clamped in position by any suitable means. Four points A, B, C, and D are located upon the ring equidistant from each other and from the center of the turn-table and the counter-weight 20 is moved either up or down to such a point that the combined apparatus located upon the knife-edges will oscillate very slowly—that is to say, so that the center of gravity of the combined mass may be just below the plane of the knife-edges. The block 14 is now adjusted on the beam by means of the adjusting-screws 13 until the beam is horizontal. This will bring the point X, which indicates the position of a vertical line passing through the center of gravity, into the vertical plane in which the knife-edges are located. Having brought the beam into a horizontal position, the turn-table is turned one hundred and eighty degrees, so as to bring the point X into the position represented in Fig. 8, and thus out of alinement with the knife-edges, in which position the beam will be deflected from the horizontal. Sufficient weight should now be added at some point, as at point D, to bring the beam again into horizontal position. The amount of weight added at the point D we may assume to be $n$. The turn-table is now turned ninety degrees and the beam moved by means of the adjusting-screws until it is brought into horizontal position, when the point X will be in the position indicated in Fig. 9. The turn-table is now given another movement of one hundred and eighty degrees to the position indicated in Fig. 10 and weight added at some point, as at C, sufficient to bring the beam again into horizontal position. The amount of weight added at the point C may be represented by $n'$. It remains now to locate the line E–F, which lies in both the geometric center and the plane of the center of gravity. This may be done by determining the angle $\theta$, which is made by the lines E–F and A–C. Let W represent the weight of the object to be balanced, $w$ the weight of the table, $a'$ the perpendicular distance of the center of gravity of the combined object and table from the line A–C, $a^2$ the perpendicular distance of the center of gravity of the combined wheel, table, and weight $n$ from the line B–D, and $r$ the distance of each of the weights $n$ and $n'$ from the center of the table and we have the relation represented by the formula $$\frac{n}{n'} = \frac{(W + w)}{(W + w + n)} \frac{a'(r - a^2)}{a^2(r - a')}.$$

Since the weight $n$ is so small as compared with the weight $(W + w)$ that it may be disregarded in the second member of the equation without involving any serious departure from accuracy, the formula will reduce to $$\frac{n}{n'} = \frac{r - a}{r - a'} \tan. \theta,$$

in which $a$ represents the perpendicular distance of the center of gravity of the combined object and table from the line B D. In this formula the values $a$ and $a'$ are so small as compared with the value $r$ that they may be disregarded without materially affecting the practical results sought, and by neglecting these values the formula becomes $$\frac{n}{n'} = \tan. \theta.$$

With this formula the weights $n$ and $n'$ being known the angle $\theta$ may be readily determined. The angle may be determined by means of different manipulations of the table and the use of different formulæ, if desired, the method here set forth being merely illustrative. The turn-table is now turned to the position indicated in Fig. 11, in which line E F is at right angles to the plane of the knife-edges, and the block 14 is again adjusted by means of the adjusting-screws, so as to bring the beam into horizontal position. The turn-table is then given a movement of one hundred and eighty degrees into the position shown in Fig. 12, and the amount of weight determined which will be required to bring the beam again into horizontal position. The weight necessary to be added to point E or to be taken away from point F will be exactly half this amount. As has already been stated, it is obviously necessary that the turn-table be first correctly balanced before any attempt is made to balance any device placed thereon.

While I have shown and described specific mechanism, I desire it to be understood that the details of construction may be varied within reasonable limits without departing from the spirit and scope of my invention.

I claim as my invention—

1. The combination with a frame provided with knife-edge bearings, of a beam supported on said bearings and a turn-table supported by said beam and adjustable laterally with reference to said knife-edge bearings.

2. The combination with a frame provided with knife-edge bearings, of a beam supported on said bearings, a turn-table mounted on said beam, means for adjusting the turn-table on the beam transversely with reference to the knife-edge bearings, and means for adjusting the center of gravity of the combined apparatus that is supported on the knife-edge bearings.

3. The combination with a frame provided with knife-edge bearings, of a beam supported on said bearings, a block adjustably mounted on said beam and having a vertical spindle and a turn-table mounted on said spindle.

4. In a balancing-machine, a turn-table, a support therefor mounted upon knife-edge bearings and means for adjusting the turn-table on its support transversely with reference to the knife-edge bearings.

5. In a balancing-machine, a turn-table and a support therefor mounted upon knife-edge bearings, in combination with means for vertically adjusting the center of gravity of the parts which are supported upon the knife-edge bearings.

6. A block having a knife-edge in its upper face and a pin projecting from its lower face, said lower face being spherically curved, in combination with a support having a spherically-curved seat and an aperture for said pin.

7. A block having a knife-edge projecting from its upper face and a pin projecting from its lower face, said lower face being spherically curved, in combination with a support having a spherically-curved seat and an aperture for the pin, said aperture being wider than the pin in the direction of the knife-edge.

8. A block having a knife-edge in its upper face and a pin projecting from its lower face, said lower face being spherically curved, in combination with a support having a spherically-curved seat and an oblong aperture for said pin, the smaller diameter of which is substantially the same as that of the pin.

9. A block having a knife-edge projecting from its upper face and a pin projecting from its lower face, said lower face being spherically curved, in combination with a support having a spherically-curved seat and an aperture for the pin, said aperture being wider than the pin in the direction of the knife-edge and of substantially the same diameter as the pin at right angles to the knife-edge.

10. In a balancing-machine, the combination with a suitable frame, having self-alining knife-edge bearings, of a beam supported on said bearings, and a turn-table adjustably mounted on said beam.

11. In a balancing-machine, the combination with a suitable frame having self-alining knife-edge bearings, of a beam supported on said bearings, a turn-table suported on said beam and adjustable laterally with reference to said bearings and a vertically-adjustable weight suspended from the turn-table.

12. In a balancing-machine, the combination with a suitable frame having self-alining knife-edge bearings, of a beam supported on said bearings, a block adjustably mounted on said beam, a turn-table supported upon said block, and a vertically-adjustable weight suspended from said block.

In testimony whereof I have hereunto subscribed my name this 28th day of February, 1900.

FRANCIS HODGKINSON.

Witnesses:
WESLEY G. CARR,
W. SUMNER SEIBERT.